Figure 1:
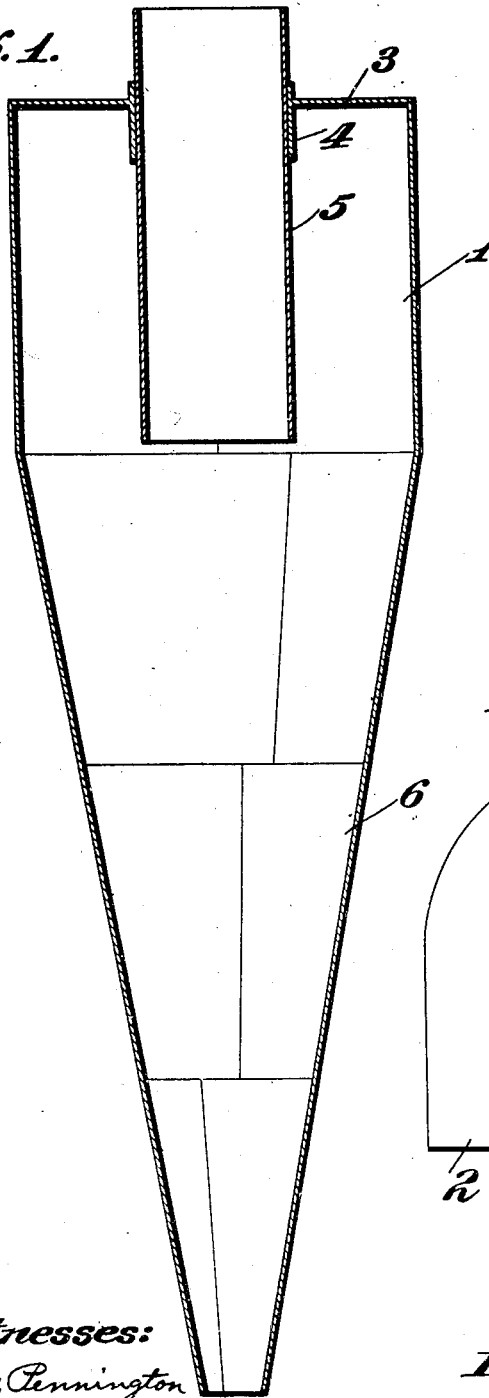

R. L. BOBBITT.
DUST COLLECTOR.
APPLICATION FILED NOV. 27, 1914.

1,354,878.

Patented Oct. 5, 1920.

Witnesses:
G. A. Pennington
Stella Hill

Inventor:
Robert L. Bobbitt,
By Bruce A. Elliott
Atty.

UNITED STATES PATENT OFFICE.

ROBERT L. BOBBITT, OF WICHITA, KANSAS, ASSIGNOR, BY DIRECT AND MESNE ASSIGNMENTS, TO BOBBITT DUST COLLECTOR COMPANY, OF KANSAS CITY, MISSOURI, A COPARTNERSHIP.

DUST-COLLECTOR.

1,354,878.     Specification of Letters Patent.     Patented Oct. 5, 1920.

Application filed November 27, 1914. Serial No. 874,102.

*To all whom it may concern:*

Be it known that I, ROBERT L. BOBBITT, a citizen of the United States, residing in Wichita, in the county of Sedgwick and State of Kansas, have invented new and useful Improvements in Dust-Collectors, of which the following is a specification.

This invention relates to improvements in dust collectors of the type employing an upper cylindrical portion and a lower frusto-conical portion, the dust laden air entering the cylindrical portion tangentially so as to be given a whirling motion within the device, the particles of dust passing to the outer circumference of the collector, and the air freed from the dust escaping through an opening in the top. The dust sinks by gravity and passes out through an opening in the minor end of the device. This type of dust collector is well known and in very general use. Such dust collectors are in all cases, so far as I am aware, of relatively short height compared with their width, their total height ranging from one-fourth to one-half greater than the greatest diameter, which, of course, is at the top. I have found it to be necessary to the successful operation of these devices that sufficient space should be provided within the tapering or frusto-conical portion to provide for the formation of what is known in the art of pneumatics as a dead air space. According to my invention I construct the collector in such a way as to form a dead space, which is practically free from dust and immediately under the outlet pipe, or opening in the top. If this dead air space were not formed the dust would be blown out of the top of the collector along with the air. This latter objection is incident, in a greater or less degree, to the use of all dust collectors of this type, and so far as I am aware no one has devised means for preventing it. This is probably due to the fact that as commonly used in mills, and especially on the outside of the mill, these dust collectors are of relatively large diameter, and this fact has probably prevented anyone from discovering that an increase in the height of the device relative to its diameter would result in a new and more effective mode of operation. Thus, to give an idea of the dimensions of these dust collectors, it may be stated that the smaller sizes will approximate, in round numbers, seven feet in length, and six feet in diameter; while the largest size, of which I am aware, is nineteen and one-half feet in height and thirteen feet in diameter. Smaller sizes for indoor use are made, but the approximate proportion of length to diameter above referred to is, I believe, uniformly maintained.

I have discovered that the diameter of this type of dust collector may be very greatly reduced, provided the total length of the device is likewise greatly increased; and that such radical change in the dimensions of the dust collector yields the important result that a relatively long or deep dead or dust free air space is formed in operation on the inside of the device; and owing to the extension of the inclined walls of the frusto-conical portion for a great distance below this dead air space, the dust, which is thrown by centrifugal action against the surrounding wall of the collector, has ample opportunity to sink by gravity below said dead air space and thus escapes being caught up by the out-going current of air which would otherwise blow it out of the top of the collector.

In the drawing—

Figure 2:
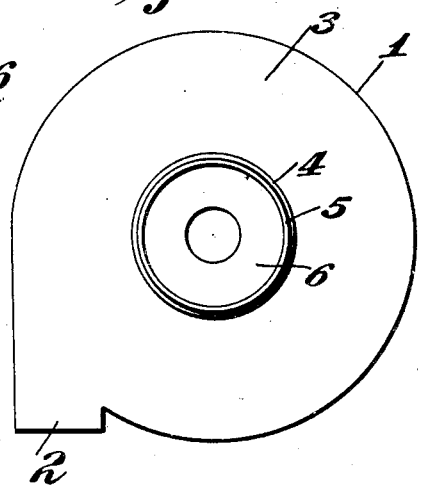

Figure 1 is a central vertical sectional view of a dust collector constructed according to my invention; and Fig. 2 is a plan view thereof.

Referring to the drawing, the dust collector is preferably constructed with a cylindrical portion 1 at the top, which is provided with a tangentially-arranged inlet portion 2 for the dust-laden air. The top 3 is centrally apertured, and in this aperture is fixed a sleeve 4 in which is mounted a tube 5 which is vertically adjustable, and is designed to be held in adjusted positions by frictional contact with the sleeve 4. According to the volume of dust-laden air entering the inlet 2 the tube 5 will be adjusted to bring its lower end nearer to or farther from the said inlet in order to vary the volume of air maintained in the upper portion of the dust collector; but after being once adjusted no further adjustment is required so long as there is no material variation in the volume of air caused to enter through the inlet 2. Depending from the bottom of the cylindrical portion 1 is a frusto-conical portion 6, which is open, as usual, at its vertex, that is, at its lower or smaller end. The dust collector, as a whole, is constructed of suitable metal, and in sections, in the usual way, but differs from all dust collectors heretofore manufactured prior to my invention in that it is made of relatively great length particularly in its conical portion as compared with its greatest diameter. As the air enters the inlet 2 it develops a circumferential air current which is guided by the interior of the collector while maintaining its high velocity, to a level below the outlet tube, and which may be properly called a critical level. In the interior of the collector there is also developed a central ascending column of air, the source of supply of which is the lower portion of the circumferential air current. On account of the relatively acute angle and great length of the conical wall, this source of supply for the ascending air column is diffused over a relatively extended space, from which it follows that the velocity developed in the ascending column below the critical level is insufficient to carry up the dust. In other words, the high velocity circumferential-current carries the dust down in the interior to a level from which the ascending central column is too weak to carry the dust up through the outlet tube.

In order that those skilled in the art may be able to have a basis on which to compare my improved dust collector with a dust collector of the type commonly constructed, I will state that the dust collector shown in the accompanying drawing is in true proportion, the cylindrical part 1 being about twenty-eight inches in height, and the frusto-conical portion being about seven feet in height, making the total height of the dust collector nine feet, four inches. The diameter of the upper or cylindrical portion, or the greatest diameter of the device, is approximately two feet, eight inches. Thus, it will be seen that the total height of the dust collector is about three and one-half times its greatest diameter.

While dust collectors constructed according to my invention are now in successful operation I have been unable to ascertain in a scientific way the precise relation which the length should bear to the greatest diameter to obtain the highest efficiency in use; but I have by experiment approximated the solution of this problem, and find that the proportion named should be not less than three to one; that is to say, the total height should be at least three times that of the greatest diameter. It will be understood, of course, that the exact proportions set forth herein may be varied within certain limits, which I am not now able to definitely state; but in all cases the total height should be considerably more than that of the greatest diameter, and by experiments I have demonstrated that the best results are obtained when the proportion above given is observed. In such a dust collector the upward central current passing through the outlet tube 5 fails to carry up the dust. I have constructed dust collectors with a greater height relative to the diameter than that stated without observing any material difference in operation. I have found, however, that when the length is materially lessened relative to the diameter from the proportion named the operation is not so satisfactory, there being then a tendency for the dust to blow out of the top.

I claim:

1. A centrifugal dust collector consisting of an upper cylindrical portion with a central outlet-tube projecting down into the interior thereof, said cylindrical portion having a tangential inlet opening for admitting the dust-laden air at a high velocity, and thereby develop a circumferential air current, said dust collector having a lower portion below said tube co-axial with said cylindrical portion operating to guide said circumferential current while maintaining its high circumferential velocity, downwardly to a critical level below said tube, said lower portion having a conical wall tapering to a vertex having a dust outlet below said tube, and operating to develop a central ascending air column whose supply source is the lower portion of said circumferential air current, the length of said collector being substantially three times the greatest diameter thereof whereby said lower conical portion is relatively long so that the said supply source for said ascending air column is diffused over a relatively extended space, whereby the upward velocity of the air in said ascending column is insufficient to carry up the dust from below said critical level through said outlet tube, the interior of said collector being unobstructed throughout, and the inner face of the wall of said cylindrical and conical portions being uninterrupted.

2. A centrifugal dust collector consisting of an upper cylindrical portion with a central upper outlet, said cylindrical portion having a tangential inlet opening for admitting the dust-laden air at a high velocity to develop a circumferential air current in said collector, said collector having a lower portion of conical form below said outlet, said conical portion tapering downwardly to a vertex having a dust outlet, the length of said collector being substantially three times the greatest diameter thereof whereby the current of air passing up through said upper outlet fails to carry up the dust from the interior of said collector.

3. A separating chamber having a tangential inlet for dust laden air and adapted to confine a whirling body of air and dust, an opening at one end thereof for purified air, and a relatively small centrally disposed opening at the other end for dust, said chamber having a tapering portion of the shape of a cone whose altitude is substantially three times the diameter of its base, said dust outlet opening being adjacent to the apex of said cone.

4. A separating chamber having a cylindrical portion, a tangential inlet for dust laden air in said cylindrical portion, an outlet for purified air, an outlet for dust, and a tapering portion of the shape of a cone having an altitude equal to substantially three times the diameter of its base and having a smooth uninterrupted inner surface, said dust outlet opening being located adjacent to the apex of said cone.

In testimony whereof, I have hereunto set my hand in presence of two subscribing witnesses.

ROBERT L. BOBBITT.

Witnesses:
JOHN I. NORRIS,
A. E. ELLIS.